(12) United States Patent
Prakash et al.

(10) Patent No.: US 7,147,958 B2
(45) Date of Patent: *Dec. 12, 2006

(54) MEMBRANE ELECTRODE ASSEMBLY FOR A FUEL CELL

(75) Inventors: Surya Prakash, Hacienda Hts., CA (US); Sekharipuram R. Narayanan, Arcadia, CA (US); Anthony Atti, Pasadena, CA (US); George Olah, Beverly Hills, CA (US); Marshall C. Smart, Studio City, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 09/912,804

(22) Filed: Jul. 24, 2001

(65) Prior Publication Data

US 2003/0207167 A1    Nov. 6, 2003

Related U.S. Application Data

(62) Division of application No. 09/489,515, filed on Jan. 21, 2000.

(60) Provisional application No. 60/116,747, filed on Jan. 22, 1999.

(51) Int. Cl.
*H01M 4/86* (2006.01)
*H01M 4/90* (2006.01)
*H01M 4/96* (2006.01)

(52) U.S. Cl. .......................................... 429/42; 429/43

(58) Field of Classification Search ................ 429/42, 429/43, 44
See application file for complete search history.

(56) References Cited

U.S. PATENT DOCUMENTS

| 3,798,063 | A |  | 3/1974 | Decraene |
|---|---|---|---|---|
| 3,899,354 | A |  | 8/1975 | Kordesch |
| 4,272,353 | A |  | 6/1981 | Lawrance et al. |
| 5,186,877 | A |  | 2/1993 | Watanabe |
| 5,308,465 | A |  | 5/1994 | Hillrichs et al. |
| 5,599,638 | A |  | 2/1997 | Surampudi et al. |
| 5,643,689 | A |  | 7/1997 | Fleischer et al. |
| 5,656,386 | A |  | 8/1997 | Scherer et al. |
| 5,677,074 | A |  | 10/1997 | Serpico et al. |
| 5,773,162 | A |  | 6/1998 | Surampudi et al. |
| 5,783,325 | A | * | 7/1998 | Cabasso et al. ............... 429/42 |
| 5,795,496 | A |  | 8/1998 | Yen et al. |
| 5,865,968 | A | * | 2/1999 | Denton et al. .............. 204/284 |
| 5,919,583 | A |  | 7/1999 | Grot et al. |
| 5,945,231 | A | * | 8/1999 | Narayanan et al. ........... 429/30 |
| 5,958,616 | A | * | 9/1999 | Salinas et al. ................ 429/41 |
| 5,992,008 | A | * | 11/1999 | Kindler ....................... 29/730 |
| 6,042,964 | A |  | 3/2000 | Sharma et al. |
| 6,444,343 | B1 | * | 9/2002 | Prakash et al. ............... 429/33 |

FOREIGN PATENT DOCUMENTS

| DE | 3538732 | 6/1986 |
|---|---|---|
| GB | 1151787 | 5/1969 |
| WO | 98/22989 | 5/1998 |
| WO | 00/45448 | 8/2000 |

OTHER PUBLICATIONS

Dupont™ Nafion® PFSA Polymer Dispersions product information guide from www.dupont.com.*
Ballatore et al., "A Facile Route to Paclitaxel C-10 Carbonate Analogues," Bioorg Med Chem Lett May 16, 2005;15(10):2477-80.
Derwent English language abstract for German Patent Publication, DE 3538732, published Jun. 26, 1986, entitled: "Porous composite for electrochemical cell and prodn. - from active carbon powder paste in polyvinylidene fluoride soln. in dmf for hydrogen of hydrogen peroxide mfr".

* cited by examiner

*Primary Examiner*—Patrick Joseph Ryan
*Assistant Examiner*—Julian Mercado
(74) *Attorney, Agent, or Firm*—Fish & Richardson P.C.

(57) ABSTRACT

A catalyst ink for a fuel cell including a catalytic material and poly(vinylidene fluoride). The ink may be applied to a substrate to form an electrode, or bonded with other electrode layers to form a membrane electrode assembly (MEA).

8 Claims, 2 Drawing Sheets

MEMBRANE ELECTRODE ASSEMBLY FOR A FUEL CELL

CROSS-REFERENCE TO RELATED APPLICATIONS

This is a divisional of U.S. application Ser. No. 09/489,515, filed Jan. 21, 2000, which claims the benefit of provisional application U.S. Ser. No. 60/116,747, filed Jan. 22, 1999.

FEDERALLY SPONSORED RESEARCH OR DEVELOPMENT

The U.S. Government may have certain rights in this invention pursuant to NASA Contract No. NSD7-1407.

FIELD OF THE INVENTION

This invention relates to membrane electrode assemblies for direct feed methanol fuel cells. In particular, this invention relates to catalytic ink formulations for membrane electrode assemblies.

BACKGROUND

Many advanced direct methanol fuel cell systems use as the electrolyte a proton-exchange membrane made of perfluorocarbon material available from E. I. duPont, Wilmington, Del., USA, under the trade designation NAFION 117. However, when NAFION based membranes are used in direct methanol fuel cell applications, the methanol diffusion through the membranes is too high, which allows some fuel to cross over to the cathode side of the cell. Methanol crossover to the cathode results in fuel loss, lower overall efficiency and lower cell performance. Thus, a large amount of research has focused upon methods to decrease the methanol crossover rates in direct methanol fuel cells.

In addition to problems of methanol crossover, large water permeability is observed with NAFION based systems, which causes water management problems in fuel cell stacks. To address these issues, an alternative polymer electrolyte membrane has been proposed that is made of a composite of polystyrene sulfonic acid and poly(vinylidene difluoride). Initial studies of PSSA-PVDF membranes have shown lower methanol permeability than NAFION 117 membranes and comparable proton conductivity.

Conventional PSSA-PVDF membrane MEAs have been prepared using the same processes used to prepare NAFION membrane MEAs. Catalyst electrodes are prepared by making a catalyst ink including a catalyst material, typically either Pt or Pt/Ru, and an alcohol solution of a perfluorosulfonic acid ionomer available from E. I. duPont de Nemours, Wilmington, Del., USA under the trade designation Naflon-H. The catalyst ink was either applied to a substrate such as porous carbon paper or, alternatively, directly deposited upon the membrane surface. This sandwich structure was then placed in a hot press for bonding with catalyzed TEFLON impregnated porous carbon electrodes to form a single MEA component. While this method worked well for MEAs with NAFION membranes, MEA samples made with the PSSA-PVDF membranes made by this process displayed substantially lower electrical performance in experimental fuel cells and were generally characterized by high cell resistance and low catalyst utilization values.

Therefore, the electrical performance of MEAs with PSSA-PVDF membranes requires further improvement for implementation in power sources.

SUMMARY

In one aspect, the invention is a catalyst ink for a fuel cell including a catalytic material and poly(vinylidene fluoride).

In another aspect, the invention is a process for making a catalyst ink for a fuel cell, including mixing components including a catalytic material and poly(vinylidene fluoride).

The catalyst ink may be applied to a surface of a substrate to form an electrode for a fuel cell assembly. The substrate may be a membrane or a backing.

The electrode with the deposited ink layer may be bonded with a membrane or another electrode at a temperature greater than about 180° C. to form a membrane electrode assembly (MEA).

The MEA with the deposited ink layer may be incorporated into a fuel cell stack.

The catalytic ink of the invention improves the interfacial bonding characteristics of the deposited electrocatalytic layers with the proton conducting moieties of the membrane structure, which improves the electrical performance and reduces the impedance compared to MEAs made with conventional inks. The catalytic ink of the invention also reduce methanol crossover when used in a fuel cell stack. MEAs made with the catalytic inks of the invention demonstrate good electrical performance, excellent crossover characteristics, and unique water management properties when evaluated at the cell level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
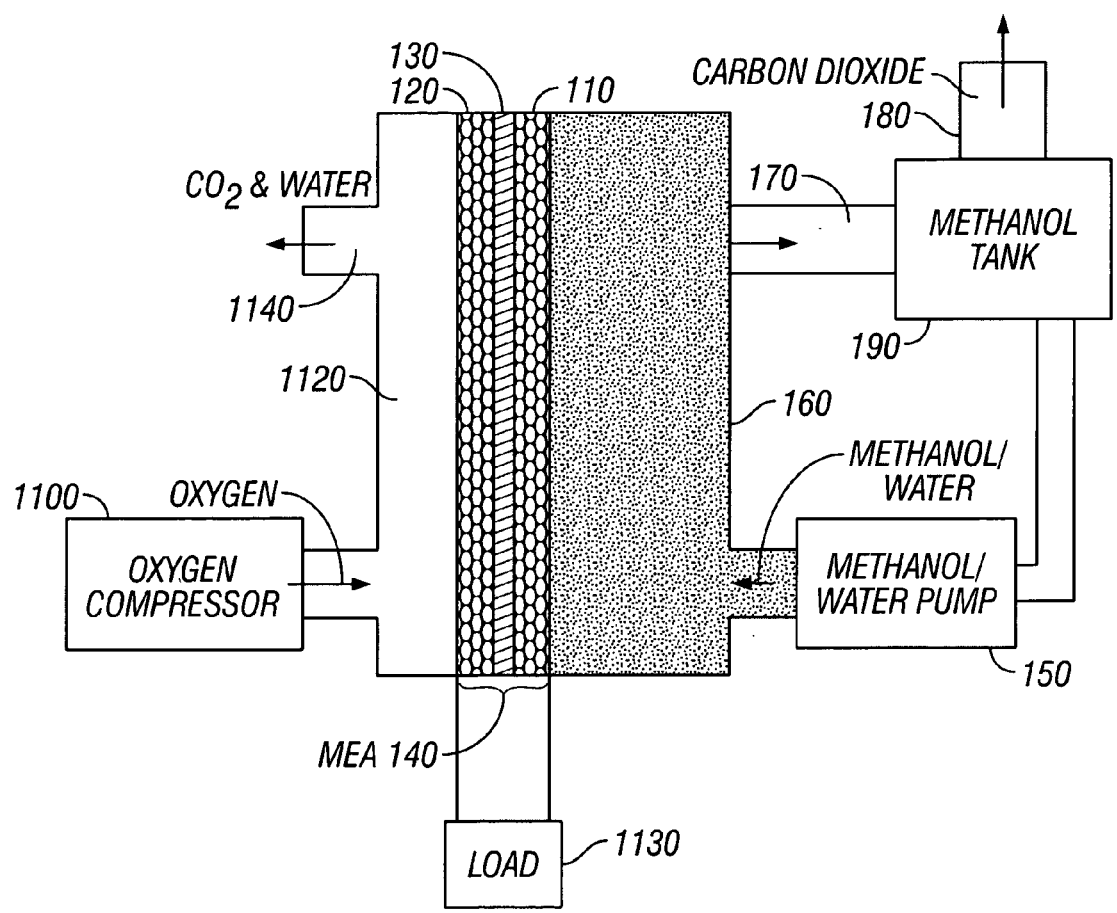
FIG. 1 is schematic cross sectional view of a direct feed fuel cell.

FIG. 1 illustrates a liquid feed organic fuel cell having anode 110, cathode 120 and solid polymer proton-conducting cation-exchange electrolyte membrane 130, preferably made of a perfluorinated proton-exchange membrane material available from E. I. duPONT de Nemours, Wilmington, Del., USA, under the trade designation NAFION. NAFION is a co-polymer of tetrafluoroethylene and perfluorovinylether sulfonic acid. Other membrane materials can also be used.

Anode 110, cathode 120 and solid polymer electrolyte membrane 130 are bonded to form a single multi-layer composite structure, referred to herein as membrane-electrode assembly "MEA" 140.

A fuel pump 150 is provided for pumping an organic fuel and water solution into anode chamber 160. The organic fuel and water mixture is withdrawn through outlet port 170 into a methanol tank 190 and recirculated. Carbon dioxide formed in anode chamber 160 is vented through port 180 within the tank 190. An air compressor 1100 is provided to feed oxygen or air into a cathode chamber 1120. Carbon dioxide and water are removed through a port 1140 in the cathode chamber 1120.

Prior to use, anode chamber 160 is filled with the organic fuel and water mixture. Cathode chamber 1120 is filled with air or oxygen either at ambient pressure or in a pressurized state. During operation, the organic fuel in anode chamber 160 is circulated past anode 110. Oxygen or air is pumped into cathode chamber 1120 and circulated past cathode 120. When electrical load 1130 is corrected between anode 110 and cathode 120, electro-oxidation of the organic fuel occurs at anode 110 and electro-reduction of oxygen occurs at cathode 120. The occurrence of different reactions at anode 110 and cathode 120 give rise to a voltage difference between those two electrodes.

Electrons generated by electro-oxidation at anode 110 are conducted through external load 1130 and are captured at cathode 120. Hydrogen ions or protons generated at anode 110 are transported directly across membrane electrolyte 130 to cathode 120. A flow of current is sustained by a flow of ions through the cell and electrons through external load 1130.

The cathode 120 is a gas diffusion electrode in which unsupported or supported platinum particles are bonded to one side of the membrane 130. In the process of the invention, a catalytic composition, referred to herein as a catalyst ink, is applied to at least one surface of the membrane 130 or to at least one surface of an electrode backing material.

The cathode 120 and the anode 110 are gas diffusion electrodes in which electrocatalyst particles are bonded to at least one side of the membrane 130. To make the cathode 120 and the anode 110, an electrocatalytic composition, referred to herein as a catalyst ink, is applied to at least one surface of the membrane 130 or to at least one surface of an electrode backing material.

For the cathode 120, the catalytic material may be in the form of fine metal powders (unsupported), or dispersed on high surface area carbon (supported), and is preferably unsupported platinum black, fuel cell grade, available from Johnson Matthey Inc., USA or supported platinum materials available from E-Tek Inc., USA. The loading of the alloy particles in the electrocatalyst layer is preferably in the range of about 0.5 mg/cm$^2$ to about 4.0 mg/cm$^2$. More efficient electro-oxidation is realized at higher loading levels.

The electrocatalyst in the anode 110 is formed from supported or unsupported platinum-ruthenium particles. A bimetallic powder, having separate platinum particles and separate ruthenium particles gives better results than platinum-ruthenium alloy. In a preferred embodiment, the platinum and ruthenium compounds are uniformly mixed and randomly spaced throughout the material, i.e., the material is homogeneous. This homogeneous bimetallic powder is used as the anode catalyst material. The preferred ratio of platinum to ruthenium can be between 60/40 and 40/60. The desired performance level is believed to occur at 60% platinum, 40% ruthenium. Performance degrades slightly as the catalyst becomes 100% platinum. Performance degrades more sharply as the catalyst becomes 100% ruthenium. For platinum-ruthenium, the loading of the alloy particles in the electrocatalyst layer is preferably in the range of about 0.5 mg/cm$^2$ to about 4.0 mg/cm$^2$. More efficient electro-oxidation is realized at higher loading levels.

The catalyst ink may also include an ionomer to improve ion conduction and provide improved fuel cell performance. Ionomer materials perfluorosulfonic acid, e.g. NAFION, alone or in combination with TEFLON. A preferred form for the ionomer is a liquid copolymer of perfluorovinylether sulfonic acid and tetrafluoroethylene. To improve the performance of PSSA-PVDF membranes, PVDF is added to the catalyst ink, preferably in a powder form.

While not wishing to be bound by any theory, it is believed that the formation of the proton conducting channels at the interface of the PSSA-PVDF membrane and deposited catalyst layer is governed by inter-miscibility of the various polymers. Conventional catalyst inks included only NAFION ionomer. However, NAFION and PVDF-PSSA do not have similar properties, and the entropy of mixing between these to polymers is not favorable. Therefore, to improve the miscibility between the polymers in the catalyst ink and the membrane, it is important add a compatible ionomeric material to the catalyst ink so that the deposited catalyst layer acquires properties similar to the membrane. PVDF having a low intrinsic permeability to methanol will result in low crossover through the anode structure into the membrane.

In addition, since PSSA-PVDF membranes do not swell significantly in water, they do not have the desired plasticity when the membrane is bonded to the electrodes under hot pressing conditions. The use of a high boiling solvent in the catalyst ink, such as, for example, N,N-dimethylacetamide (DMA), provides a plasticizing effect. The use of N,N-dimethylacetamide (DMA) and other solvents also prevents membrane dry-out during the MEA fabrication process and thereby result in an MEA that is has a lesser tendency to de-laminate.

The catalyst ink is preferably applied directly on at least one side of a substrate such as the membrane 130 or on an electrode backing material to form a catalyst-coated electrode. Suitable backing materials include, for example, carbon fiber papers manufactured by Toray Industries, Tokyo, Japan. These carbon papers are preferably "TEFLONized" to be about 5 wt % in TEFLON.

The application process includes spraying or otherwise painting the catalyst ink onto the substrate, with both the ink and the substrate at or substantially near room temperature. No high temperature treatment step is required to activate the hydrophobic particles in the catalyst ink solution. After drying on the substrate, the loading of the catalyst particles onto the substrate is preferably in the range of about 0.5 mg/cm$^2$ to about 4.0 mg/cm$^2$.

The application of the catalyst ink on to the membrane is significantly improved if the membrane surface is roughened prior to application of catalyst ink. Surface roughening provides additional anchoring sites for the catalyst and the polymer.

The membrane may be roughened by contacting the membrane surface with a commercial paper coated with fine abrasive. The abrasive should preferably have a grit size in the range of about 200 to about 400.

The abrasive material should be selected such that particles of the abrasive impregnated in the membrane are tolerated by the fuel cell. Abrasives that are preferred are silicon nitride, boron nitride, silicon carbide, silica and boron carbide. Abrasive using iron oxide or aluminum oxide should be avoided as these materials result contaminate the membrane with metal ions leading to increased resistance and this is undesirable.

Both sides of the membrane are roughened. The membrane is then held in a fixture and preferably allowed to dry before the catalyst ink is painted.

The anode 110, the membrane 130, and the cathode 120 may be assembled into the membrane electrode assembly 140. Once bonded together, the anode 110, cathode 120 and membrane 130 form a single composite layered structure. Preferably, the electrode and the membranes are first laid or stacked on a CP-grade 5 Mil (0.013 cm), 12-inch (30.5 cm) by 12-inch (30.5 cm) titanium foil to prevent acid from the membrane from leaching into the electrode.

Improving the melt-flow characteristics of the polymer membrane during the hot pressing process enhances the interfacial bonding. TGA analysis indicates that PSSA-PVDF systems are relatively stable to about 220° C. In addition, conductivity measurements of membrane samples before and after being subjected to high temperature (up to about 200° C.) suggest that loss of sulfonic acid groups (conducting moieties) does not occur under these conditions. Both of these aspects suggest that temperatures higher than about 180° C. should be employed to improve the melt-flow characteristics of membrane sample, thus improving the interfacial bonding characteristics of the MEA.

The invention will now be further described with reference to the following non-limiting example.

EXAMPLE

Prior to deposition of the catalyst ink, PSSA-PVDF membrane samples were dried and the surface scoured with 240 grade abrasive-coated paper to roughen the membrane surface for enhanced bonding characteristics.

The membrane sample was then sandwiched between two TEFLON (PTFE) blocks with a 2 inch (5 cm)×2 inch (5 cm) window exposed. The membrane sample is then dried with a hand held blower for approximately 30 minutes or until the membrane surface is taut and dry.

Two different types of catalyst ink mixtures were prepared. The inks were applied to the membrane surface and to the surface of a TEFLONized backing paper available from Toray Industries, Tokyo, Japan. The backing paper was impregnated with about 5% by weight TEFLON.

The catalyst ink mixtures in Table 1 were applied to the eventual anode and cathode sides of the membrane. Sonication was used to ensure adequate mixing of the components.

TABLE 1

| ANODE | CATHODE |
| --- | --- |
| 140 mg Pt/Ru | 180 mg Pt |
| 400 mg H$_2$O | 400 mg H$_2$O |
| 720 mg NAFION | 720 mg NAFION |
| (5 wt %) | (5 wt %) |
| 400 mg DMA | |

The catalyst ink mixtures in Table 2 were applied to the carbon papers. Sonication was used to ensure adequate mixing of the components.

TABLE 2

| ANODE | CATHODE |
| --- | --- |
| 140 mg Pt/Ru | 180 mg Pt |
| 400 mg H$_2$O | 400 mg H$_2$O |
| 720 mg NaFION | 720 mg NAFION |
| (5 wt %) | (5 wt %) |

The catalyst ink prepared for the membrane was applied to the membrane surface using a painting technique. A painting technique was also used to apply the catalyst ink onto the carbon paper. For the carbon paper, one coat was applied one day prior to the MEA fabrication and a second coat approximately one hour prior to fabrication.

To fabricate the MEA, the catalytic coated membrane was positioned between the two painted gas diffusion electrodes on the surface of an 8 inch (20 cm)×8 inch (20 cm) die. Once the membrane is positioned and fastened down, a fine coating of DMA/H$_2$O solution was painted on the membrane edges. A titanium plate was inserted on the top of the membrane and a copious amount (5–7 ml) of water was added to the die. The top plate was then inserted and the die was then placed into a hot press.

Once the die was inserted into the press the die platen was closed with a force of 2000–2500 lbs (909.1–1136 kg) over a 36 cm$^2$ area electrode. The die was heated to a temperature of 180–185° C. for a period of 15 minutes and then cooled using an automated chiller. Following this procedure, the die was opened and the MEA removed and assembled into a cell for evaluation.

Figure 2:
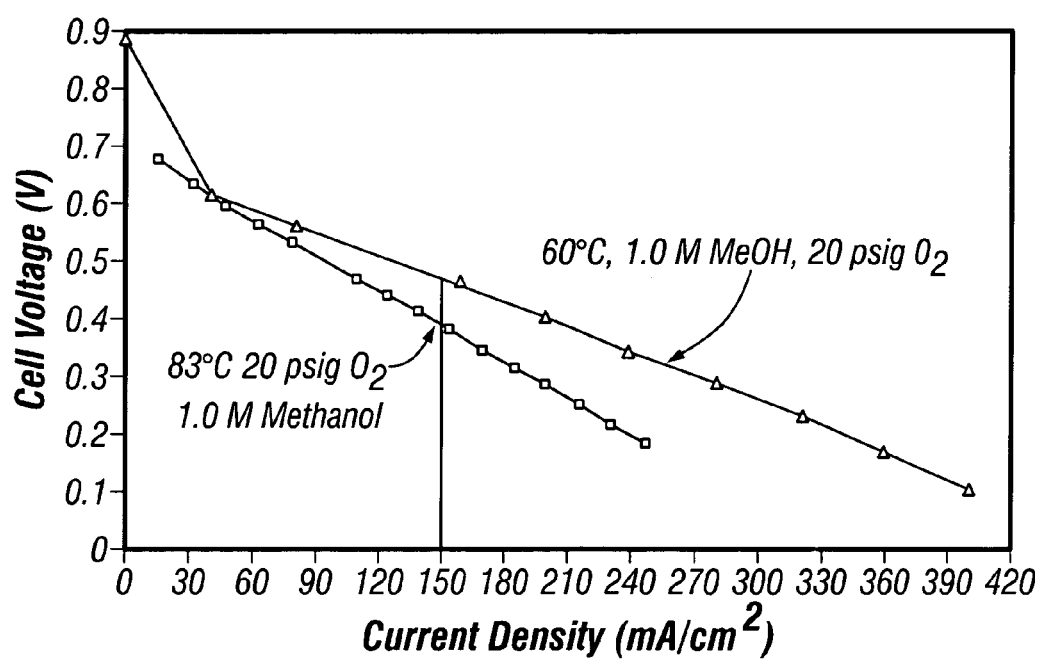
FIG. 2 is a plot of cell voltage vs. current density that compares the performance of a conventional membrane electrode assembly to that of a membrane electrode assembly of the invention.

The electrical performance of fuel cells employing membrane-electrode assemblies prepared by the process of the invention was measured and their performance compared with MEAs prepared by conventional processes. These results are shown in FIG. 2 for 1.0 M MeOH and 20 psig O$_2$. Curve I shows fuel cell performance using an MEAs prepared by the process of the invention, while curve II represents an otherwise identical fuel cell using an MEA prepared by a conventional process.

The results demonstrate that the process of the invention leads to a higher fuel cell performance. Comparing curve I and curve II, the voltage at 150 mA/cm$^2$ is increased by about 0.1 V, and the improvement at higher current densities is more than 0.2 V.

The conditions of testing, for the results shown in FIG. 2, were similar except for the temperature. It is important to remember that increasingly higher temperatures leads to improved performance in methanol fuel cells. The results show that even at a test temperature of 60° C. (curve I), the MEAs prepared by the process of the invention exceed the performance at 83° C. (curve II) obtained with MEAs prepared by the conventional process. Thus these results confirm the value of the process of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. A PSSA-PVDF membrane comprising a membrane portion, having a membrane formed of PSSA and poly (vinylidene) flouride and a first ionomer, a catalyst ink, wherein the catalyst ink comprises a catalytic material and poly(vinylidene) flouride and a second ionomer wherein the first and second ionomers are formed from the same material.

2. The membrane of claim 1, wherein the catalytic material comprises Pt.

3. The membrane of claim 1, wherein the catalytic material comprises Pt and Ru.

4. The membrane of claim 1, wherein the catalyst ink comprises the second ionomer.

5. The membrane of claim 1, wherein the catalyst ink comprises a liquid copolymer of tetrafluoroethylene and perfluorovinylethersulfonic acid.

6. The membrane of claim 1, wherein the catalyst ink further comprises a plasticizer.

7. The membrane of claim 1, wherein the plasticizer is a high boiling solvent.

8. The membrane of claim 7, wherein the plasticizer is N,N dimethylacetamide.

* * * * *